No. 802,612. PATENTED OCT. 24, 1905.
C. B. VAN HORN.
FELLY.
APPLICATION FILED MAY 20, 1904. RENEWED MAR. 30, 1905.
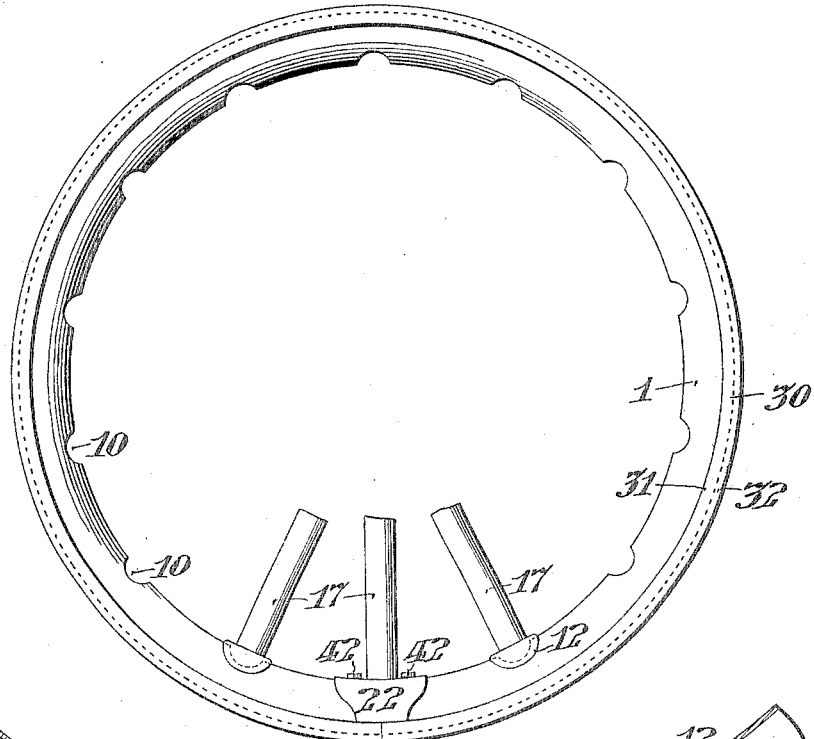
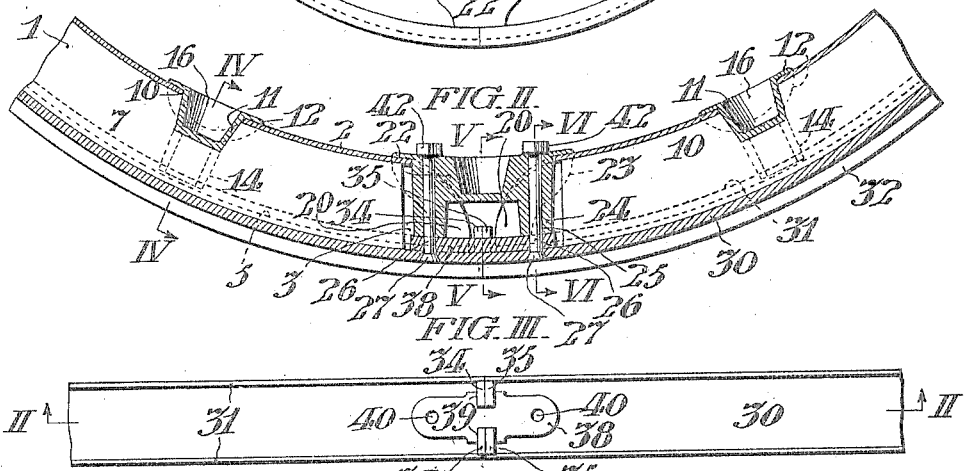
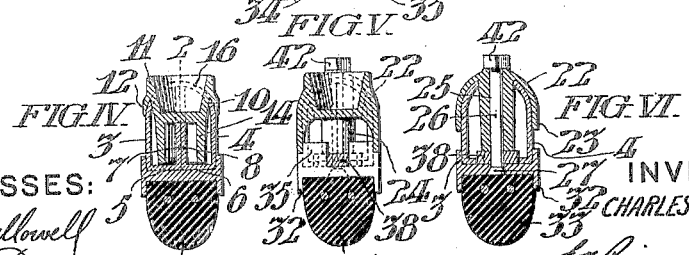
WITNESSES: INVENTOR:
CHARLES B. VAN HORN,

UNITED STATES PATENT OFFICE.

CHARLES B. VAN HORN, OF PHILADELPHIA, PENNSYLVANIA, ASSIGNOR OF ONE-HALF TO ELIJAH B. CORNELL, OF PHILADELPHIA, PENNSYLVANIA.

FELLY.

No. 802,612.     Specification of Letters Patent.     Patented Oct. 24, 1905.

Application filed May 20, 1904. Renewed March 30, 1905. Serial No. 252,921.

*To all whom it may concern:*

Be it known that I, CHARLES B. VAN HORN, of Philadelphia, in the State of Pennsylvania, have invented certain new and useful Improvements in Fellies, whereof the following is a specification, reference being had to the accompanying drawings.

My invention relates to a felly particularly designed for use in connection with wheels of the general character described in Letters Patent of the United States No. 693,929, granted to me February 25, 1902, although its use is not necessarily limited to wheels of that description.

The form of my invention hereinafter described comprises a felly formed of sheet metal provided with a removable rim having channel-flanges to receive a rubber tire, and said felly is provided with separable spoke-socket members, one of which is of special construction and provided with means to rigidly engage the circumferentially-opposed ends of the felly and rim.

My invention comprehends the various novel features of construction and arrangement hereinafter more definitely specified and claimed.

In the drawings, Figure I is a side elevation of a felly and rim embodying my invention. Fig. II is a fragmentary sectional view of said felly, taken on its central plane, indicated by the line II II in Fig. III. Fig. III is a plan view of a portion of the rim and the coupling-plate engaging the circumferentially-opposed ends thereof. Fig. IV is a radial sectional view taken on the line IV IV in Fig. II. Fig. V is a radial sectional view taken on the line V V in Fig. II. Fig. VI is a sectional view taken on the line VI VI in Fig. II.

In said figures the felly 1 is an incomplete or radially-split annulus conveniently formed of a strip of sheet metal folded, as best shown in Fig. IV, to form a rounded inner portion 2, parallel side walls 3 and 4, outer peripheral flanges 5 and 6, and inwardly-turned bracing-flanges 7 and 8, which latter are parallel with each other and with said side walls. Said felly 1 is provided with socket-recesses 10, which are each provided with spoke-sockets 11, having flanges 12 overlapping the rounded portion 2 of the felly and having bifurcated shanks 14 embracing the flanges 7 and 8, as shown in Fig. IV, and each of said sockets 11 comprises a spoke-recess 16 to receive the reduced outer end of a spoke 17. The circumferentially-opposed ends 20 of the felly 1 are coupled by the spoke-socket 22, which differs from the spoke-sockets 11. Said socket 22 is provided with flanges 23, overlapping the curved portion 2 and walls 3 and 4 of the felly 1, and comprises inwardly-projecting bosses 24, having apertures 25 for the bolts 26. The conical heads 27 of said bolts 26 are seated in correspondingly-shaped apertures in the periphery of the radially-split annular rim 30, which is provided with the inner channel-flanges 31, which engage the felly 1, and the outer channel-flanges 32, which engage the rubber tire 33. The circumferentially-opposed ends of said rim 30 are provided with inwardly-turned flanges 34 35, which are held together by the coupling-plate 38, which latter is provided with recesses 39 to receive said flanges and apertures 40 to receive the bolts 26. The felly 1, spoke-socket 22, rim 30, and coupling-plate 38 are normally maintained in the assembled relation (shown in Fig. II) by said bolts 26 and the nuts 42, engaged therewith. Said elements are conveniently assembled in the relation shown, as follows: The rim is bent in an involute curve, and thus sprung within the endless tire 33. The ends of the rim 30 are then brought together and engaged by the coupling-plate 38, as shown in Fig. III. Thereupon one end of the felly 1 (which is of resilient material, such as steel) is placed in the channel between the inner flanges 31 of the rim, and said felly is then bent in an involute curve, so as to spring the felly into said channel throughout its length. Thereupon the spoke-socket 22 is placed in the position shown in Fig. II, and the bolts 26 being inserted and secured by the nuts 42 said members are retained in rigid relation, as above described.

I do not desire to limit myself to the precise construction or arrangement above described, as various modifications may be made therein without departing from the essential features of my invention. For instance, although I have shown a felly formed of a single strip of sheet metal it is to be understood that I may employ a felly like that shown in Letters Patent of the United States No. 697,118, granted to me April 8, 1902, and consisting of opposite and complementary tubular members, each comprising an outer wall and an inner bracing-flange.

I claim—

1. The combination with a split metal felly, comprising a rounded inner portion provided with spoke-socket recesses and side walls; of spoke-sockets removably fitted in said recesses and comprising flanges overlapping the edges thereof; a special spoke-socket fitted between the circumferentially-opposed ends of said felly and comprising flanges overlapping the same; spokes detachably fitted in said sockets; a split metal rim having inner channel-flanges arranged to embrace the side walls of said felly and outer channel-flanges arranged to receive a tire; a rubber tire fitted to said rim; inwardly-turned flanges on the circumferentially-opposed ends of said rim; a coupling-plate comprising recesses engaging said rim-flanges; bolts entered through said rim, coupling-plate and special spoke-socket; and, nuts at the inner ends of said bolts normally retaining said members in assembled relation, substantially as set forth.

2. The combination with a split metal felly, comprising a rounded inner portion provided with spoke-socket recesses and side walls; of spoke-sockets removably fitted in said recesses and comprising flanges overlapping the edges thereof; a special spoke-socket fitted between the circumferentially-opposed ends of said felly and comprising flanges overlapping the same; spokes detachably fitted in said sockets; a split metal rim having inner channel-flanges arranged to embrace the side walls of said felly; inwardly-turned flanges on the circumferentially-opposed ends of said rim; a coupling-plate comprising recesses engaging said rim-flanges; bolts entered through said rim, coupling-plate and special spoke-socket; and, nuts at the inner ends of said bolts normally retaining said members in assembled relation, substantially as set forth.

3. The combination with a split metal felly; of a split metal rim, having channel-flanges arranged to embrace said felly; a special spoke-socket seated between the circumferentially-opposed ends of said felly, in registry with the circumferentially-opposed ends of said rim; inwardly-turned flanges on the ends of said rim; a coupling-plate comprising recesses engaging said rim-flanges; bolts entered through said rim, coupling-plate and special spoke-socket; and, nuts on said bolts, normally retaining said members in assembled relation, substantially as set forth.

4. The combination with a split metal felly; of a split metal rim having channel-flanges arranged to embrace said felly; and, means engaging both the circumferentially-opposed ends of the felly and of the rim, arranged to normally retain the same in assembled relation, substantially as set forth.

In testimony whereof I have hereunto signed my name, at Philadelphia, Pennsylvania, this 19th day of May, 1904.

CHARLES B. VAN HORN.

Witnesses:
ARTHUR E. PAIGE,
CLIFTON C. HALLOWELL.